June 5, 1962 — G. H. SCHURGER — 3,037,429
RIGHT ANGLE MILLING ATTACHMENT
Filed Feb. 5, 1958 — 3 Sheets-Sheet 1

INVENTOR
Gorner H. Schurger
Carlson, Pitzner, Hubbard & Wolfe
ATTORNEYS

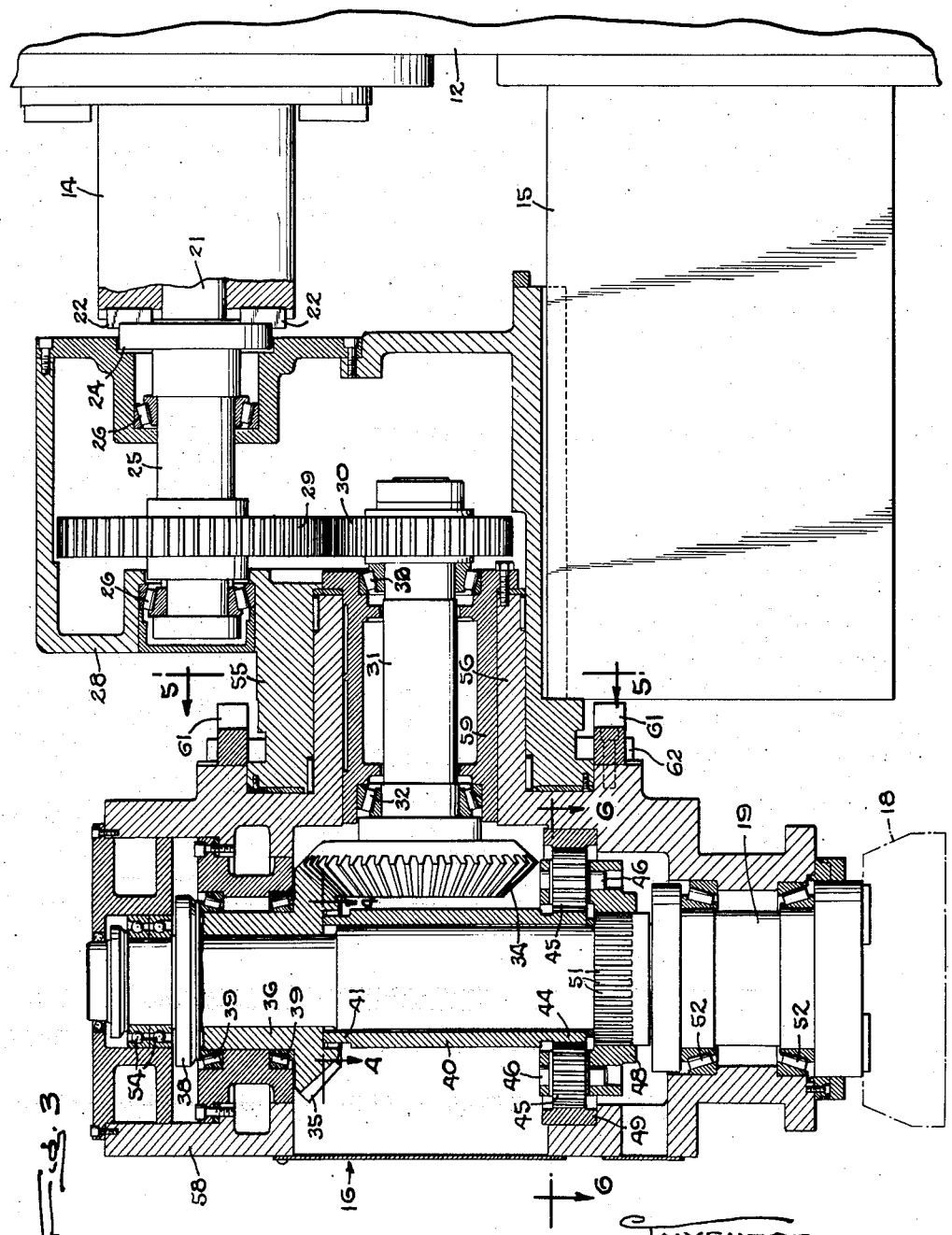

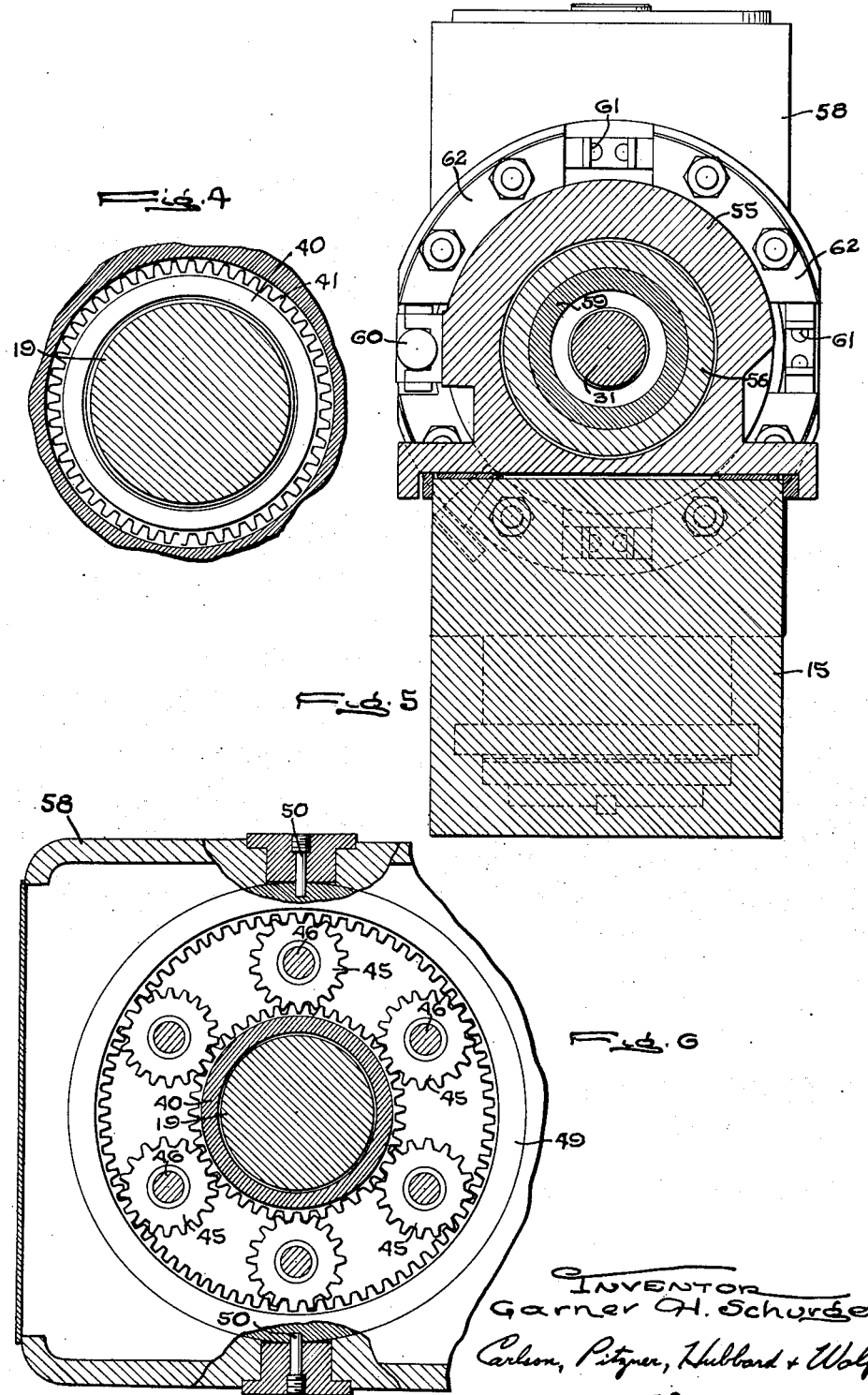

United States Patent Office 3,037,429
Patented June 5, 1962

3,037,429
RIGHT ANGLE MILLING ATTACHMENT
Garner H. Schurger, Fond du Lac, Wis., assignor to Giddings & Lewis Machine Tool Company, Fond du Lac, Wis., a corporation of Wisconsin
Filed Feb. 5, 1958, Ser. No. 713,459
1 Claim. (Cl. 90—16)

The present invention relates in general to machine tools and, more specifically, to a novel right angle milling attachment finding particular, but by no means exclusive utility, in connection with machine tools known as horizontal boring, drilling and milling machines.

One object of the invention is to provide a right angle milling attachment of the character set forth and which is adapted to transmit substantially more power to the cutter than attachments of the type heretofore known, thus increasing the machining efficiency of the operation in which the attachment is used.

Another object is to provide a milling attachment of the foregoing type and which is adapted to transmit substantial power to the cutter without requiring high-speed operation of the main driving spindle of the headstock and consequent excessive heating of such spindle.

A further object of the invention is to provide a milling attachment of the type set forth and which is particularly useful with a horizontal boring, drilling and milling machine having a headstock equipped with an underarm or other auxiliary support that can be extended or retracted in unison with the headstock spindle.

Other objects and advantages of the invention will become apparent as the following description proceeds, taken in connection with the accompanying drawings, wherein:

FIG. 3 is an enlarged vertical sectional view taken longitudinally through the illustrative milling attachment in the plane of the line 3—3 in FIG. 2.

Figure 1:
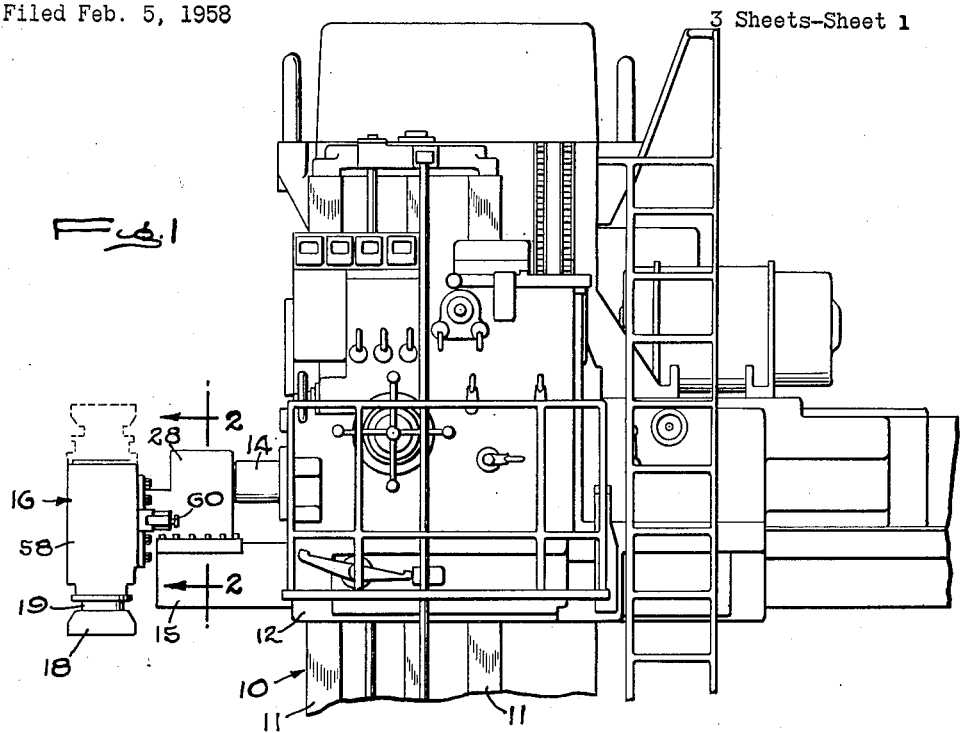
FIGURE 1 is a fragmentary front elevation view of a horizontal boring, drilling and milling machine having an illustrative milling attachment embodying the present invention.
Figure 2:
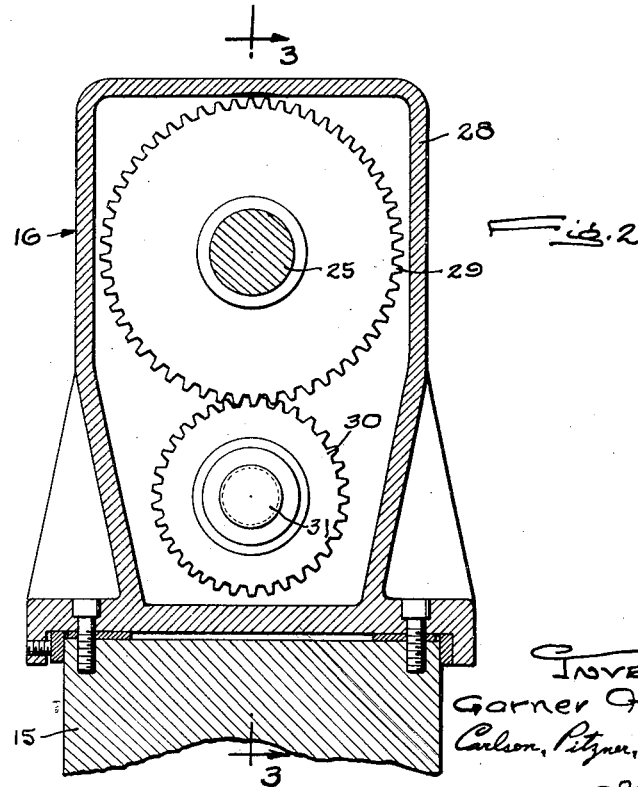
FIG. 2 is an enlarged vertical sectional view through the milling attachment shown in FIG. 1, taken in the plane of the line 2—2.

FIGS. 4 and 6 are enlarged fragmentary horizontal sectional views through the illustrative milling attachment taken, respectively, in the plane of the lines 4—4 and 6—6 in FIG. 3.

FIG. 5 is an enlarged fragmentary vertical sectional view through the attachment taken in the plane of the line 5—5 in FIG. 3.

While the invention is susceptible of various modifications and alternative constructions, certain preferred embodiments have been shown in the drawings and will be described below in considerable detail. It should be understood, however, that there is no intention to limit the invention to the specific forms disclosed, but on the contrary, the intention is to cover all modifications, alternative constructions and equivalents falling within the spirit and scope of the invention as expressed in the appended claims.

The right angle milling attachment embodying the present invention is particularly useful with machines known to those skilled in the art as horizontal boring, drilling and milling machines such as the one disclosed in United States Patent No. 2,620,710 issued on the application of Keith F. Gallimore and Garner H. Schurger. The illustrative attachment disclosed herein will, accordingly, be shown and described in that environment.

Briefly, such a machine comprises a fixed bed mounted on a shop floor and having on its upper surface a plurality of ways slidably supporting a column base or saddle. The column base or saddle supports an upstanding vertical column member 10 which is provided with vertical guideways 11 running along one face thereof. Slidably mounted on the vertical guideways is a headstock 12 carrying a power driven spindle 14 which may be disposed in extended or retracted relation with respect to the headstock. Also mounted on the headstock 12 is a structural support member or underarm 15 which may be extended or retracted in unison with the headstock spindle 14. The underarm 15 is adapted to provide auxiliary or outboard support for the spindle when in an extended position and also to provide a rigid support for any tool, fixture or attachment operatively associated with the spindle. While the underarm may be made with various structural configurations, in the present instance it happens to be of generally rectangular shape.

Rigidly mounted on the outer end of the underarm 15 for bodily translation with the spindle 14 is an illustrative right angle milling attachment 16 embodying the present invention. The attachment 16 is adapted to drive a tool such as a drill, boring bar, or face milling cutter so that machining operations can be performed in a direction perpendicular to the axis of the spindle 14. In the present instance, the attachment 16 is shown as driving a face milling cutter 18, the latter being mounted in attachment spindle 19. The machine spindle 14 is adapted to drive the attachment by means of a tapered shaft extension 21 which engages a tapered socket in the spindle, and by driving keys 22 which engage corresponding keyways in the face of a hub 24 integral with the extension 21.

Provision is made in the attachment 16 for transmitting substantial power to the attachment spindle 19 and its cutting tool without necessitating undesirable high-speed operation of the attachment driving means. This is accomplished, moreover, with a power train having bevel gearing but which avoids the power limiting effect resulting from the use of such gearing in milling attachments of the type heretofore known.

Referring more specifically to FIG. 3, it will be noted that the attachment 16 is driven through drive shaft 25 integrally connected to hub 24 and tapered extension 21. The drive shaft 25 in this instance is journaled in tapered anti-friction bearings 26 housed in appropriate recesses in the fixed casing 28 of the attachment. Keyed or otherwise rigidly fixed on the drive shaft 25 intermediate the bearings 26 is a relatively large spur gear 29 which drivingly meshes with a somewhat smaller spur gear 30, thus producing a considerable step-up in rotational speed between the latter and the former. The spur gear 30 is rigidly fixed to one end of an intermediate shaft 31 journaled in a pair of axially spaced, tapered antifriction bearings 32 mounted within the attachment casing. Rigidly fixed on the opposite end of the intermediate shaft 31 is a bevel gear 34 which drivingly meshes with a bevel gear 35 surrounding the upper portion of the attachment spindle 19. The bevel gear 35 has the same number of teeth as the bevel gear 34 but is formed with an integral sleeve 36 carrying a collar 38 at its upper end and is journaled in tapered antifriction bearings 39 for rotation independently of the attachment spindle 19.

The attachment spindle 19 is adapted to receive power from the bevel gear 35 by means of compact but exceptionally rugged planetary reduction gearing (FIGS. 3 and 6). In the present instance, a drive sleeve 40 having a toothed upper end 41 connects with a correspondingly toothed recess 42 in the bevel gear 35 for rotation bodily therewith. The sleeve 40 is telescoped over the long intermediate portion of the spindle 19 so as to have some small clearance with the same. The lower end of the sleeve 40 has a toothed portion 44 which serves as the sun gear of the planetary reduction gearing. The latter drives a plurality of planetary gears 45 journaled on pins 46 fixed to carrier 48. The gears 45 also mesh with the internal teeth of annular gear 49 fixed within the attachment casing and secured against rotation as by dowels 50 (FIG. 6). The carrier 48 is fixed on the spindle 19 as by means of splines 51 and rotates the spindle at a speed substantially below that of the bevel gear 35. The spindle 19 is, of course, appropriately supported for rotation by tapered antifriction bearings 52 adjacent the tool receiving end and by antifriction bearings 54 adjacent its opposite end.

The attachment spindle 19 and its cutting tool 18 may be swiveled through 360° and selectively positioned in a plane perpendicular to the axis of the drive shaft 25 and headstock spindle 14. In furtherance of such objective, the fixed casing 28 is formed with a hollow, outwardly extending boss 55 having a relatively large bore therein concentric with the intermediate shaft 31. Telescopically received within the boss 55 and rotatable therein is a boss 56 formed as an extension of spindle casing 58 (FIGS. 3 and 5). The boss 56 also has a longitudinal bore therein concentric with the intermediate shaft 31 and such bore houses sleeve 59 which carries the bearings 32 of the intermediate shaft 31. The spindle 19 may be secured in any one of a variety of preselected positions of swivel adjustment by means of index pin 60, mounted on the boss 55, and which is adapted to engage corresponding ones of sockets 61 mounted on the spindle casing 58. Clamps 62 are adapted to cooperate with the index pin and sockets 60, 61 and serve to hold the spindle casing 58 and the boss 55 together so as to secure these members against relative rotation.

By reason of the mechanism described earlier herein, it will be noted that the spur gears 29, 30 step up the speed of intermediate shaft 31, causing the same to rotate faster than the drive shaft 25 and headstock spindle 14. By the same token, the bevel gears 34, 35 also rotate at the speed of the intermediate shaft 31. The planetary gear connection between the bevel gear 35 and the spindle 19, however, provides a substantial speed reduction and causes the latter to rotate substantially slower than the intermediate shaft 31. With the illustrative gear train shown and described herein, the spur gears 29, 30 provide a speed increase in the ratio of 1:1.55, while the planetary gearing provides a reduction in the ratio of 2.86 to 1. Considering the entire gear train, the net effect is to provide an overall speed reduction in the ratio of 1.85:1 from the headstock spindle 14 to the attachment spindle 19. Accordingly, if a specific job requires that the cutter 18 be driven at a speed of 50 r.p.m., the headstock spindle need only operate at 92 r.p.m. The intermediate shaft 31 and bevel gears will, however, operate at the considerably higher speed of 143 r.p.m. As will be appreciated by those skilled in the art, this permits the bevel gears to transmit substantial power without at the same time requiring undesirably high-speed operation of the headstock spindle 14.

I claim as my invention:

A right angle attachment for use with boring, drilling and milling machines and comprising, in combination, a drive shaft, an intermediate shaft, an attachment spindle, said attachment spindle being disposed at right angles to said drive shaft and said intermediate shaft, a gear connection interposed between said drive shaft and said intermediate shaft adapted to drive the latter at a speed substantially greater than that of the former, a pair of meshing bevel gears each of substantially the same size, one said bevel gear being fixed to said intermediate shaft, the other said bevel gear being journaled for rotation independently of said attachment spindle, a drive sleeve mounted for rotation bodily with said other bevel gear, means defining a sun gear on said drive sleeve, a fixed ring gear disposed in spaced apart surrounding relation with said sun gear, a plurality of planetary gears disposed in meshed relation with said sun and ring gears, a carrier fixed to said spindle and having mounting means upon which said planetary gears are journaled, said sun, ring and planetary gears and said carrier being adapted to effect rotation of said attachment spindle at a speed substantially below that of said intermediate shaft.

References Cited in the file of this patent

UNITED STATES PATENTS

| | | |
|---|---|---|
| 1,720,712 | Armitage | July 16, 1929 |
| 1,975,984 | Stoll | Oct. 9, 1934 |
| 2,520,887 | Miller | July 6, 1948 |
| 2,620,710 | Gallimore et al. | Dec. 9, 1952 |
| 2,730,021 | Gallimore et al. | Jan. 10, 1956 |
| 2,811,877 | DeGroff | Nov. 5, 1957 |
| 2,844,968 | Schwab | July 29, 1958 |